United States Patent [19]

Ellingsen, Jr.

[11] Patent Number: 5,054,803
[45] Date of Patent: Oct. 8, 1991

[54] BICYCLE TRAINING WHEEL ASSEMBLY

[76] Inventor: Paul N. Ellingsen, Jr., 204 Triton Cir., Encinitas, Calif. 92024

[21] Appl. No.: 551,873

[22] Filed: Jul. 12, 1990

[51] Int. Cl.⁵ ............................................. B62H 1/10
[52] U.S. Cl. ..................................... 280/301; 280/293
[58] Field of Search ........ 280/293, 298, 299, 300–301, 280/303, 755, 763.1, 47.371, 47.315; 403/84, 378, 379

[56] References Cited

U.S. PATENT DOCUMENTS

| | | | |
|---|---|---|---|
| 1,327,864 | 1/1920 | Everingham | 280/47.371 X |
| 3,746,367 | 7/1973 | Johannsen | 280/301 |
| 3,877,727 | 4/1975 | Johannsen | 280/301 |
| 4,615,535 | 10/1986 | McMurtrey | 280/293 |

FOREIGN PATENT DOCUMENTS

| | | | |
|---|---|---|---|
| 1087400 | 2/1955 | France | 280/293 |
| 2276209 | 1/1976 | France | 280/293 |
| 782362 | 9/1957 | United Kingdom | 280/303 |

Primary Examiner—Charles A. Marmor
Assistant Examiner—Paul Dickson
Attorney, Agent, or Firm—Baker, Maxham, Jester & Meador

[57] ABSTRACT

A bicycle training wheel assembly comprises a brace having an inner mounting member for attachment to a rear fork member of a bicycle frame and at least one side support member connected to and extending from the inner mounting member. The assembly further comprises an elongate arm having an auxiliary wheel rotatably mounted to an outer end thereof and having an inner end pivotally mounted to the side support member of the brace. This allows the arm to pivot laterally with respect to a longitudinal axis of the bicycle frame to thereby raise and lower the auxiliary wheel through a predetermined range of angular movement. The arm may be selectively locked at one of a plurality of angular adjustment positions.

7 Claims, 1 Drawing Sheet

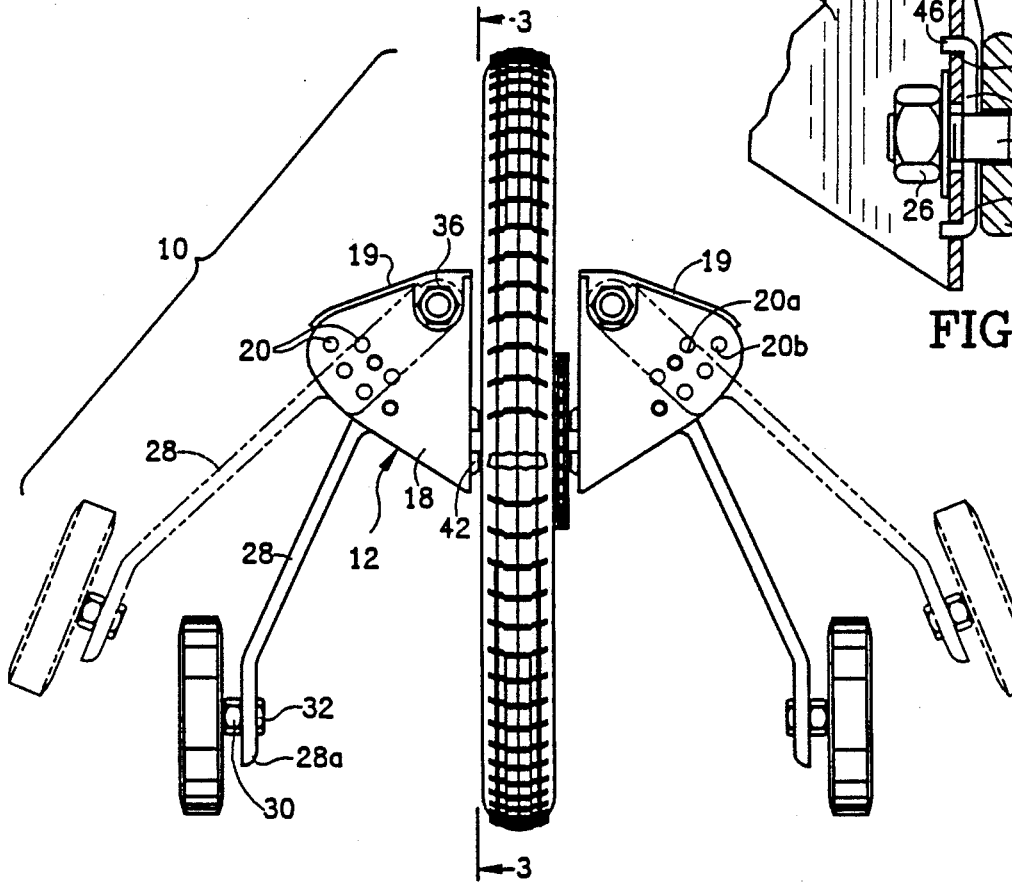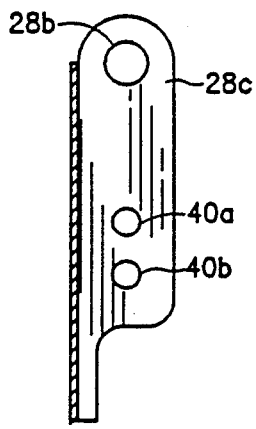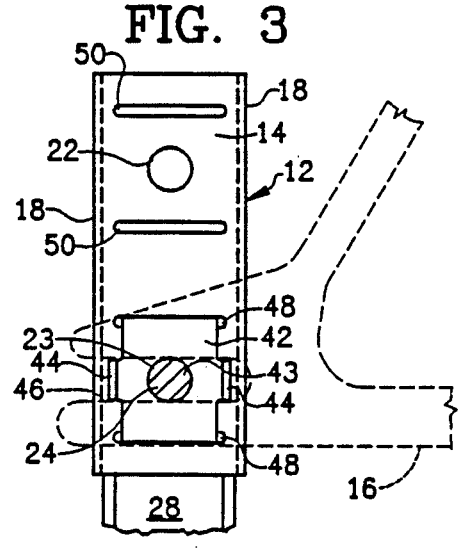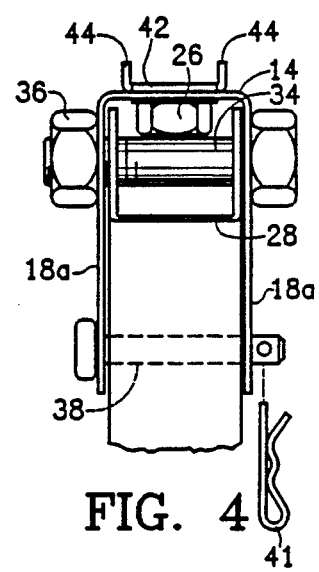

BICYCLE TRAINING WHEEL ASSEMBLY

BACKGROUND OF THE INVENTION

The present invention relates to bicycles, and more particularly, to training wheels that are attachable to a bicycle frame.

For many years, training wheels have been available to help a child learn how to ride a bicycle. Typically they comprise a pair of L-shaped brackets. A small auxiliary wheel is rotatably attached to the outer end of the horizontal leg of each bracket. The vertical legs of the brackets have holes or slots that can fit over the axle of the rear wheel and are held to the frame by the axle nuts. The brackets are attached so that the small wheels are positioned outwardly from opposite sides of the bicycle frame. Both training wheels contact the ground to support the bicycle upright as the child pedals. The height of these conventional training wheels can be adjusted by moving the vertical brackets up or down, primarily to accommodate sixteen-inch versus twenty-inch size bicycles. However, this does not change the horizontal positioning of the training wheels relative to the rear bicycle wheel. In some cases, one of the training wheels will be off the ground at most a couple of inches when the other training wheel is in contact with the ground. Thus, when conventional training wheels are used, the child is supported nearly vertical at all times. As a consequence, there is a difficult transition when the training wheels are removed, and all at once the child must balance as he or she is riding, and learn to maintain this balance while banking significantly on sharp turns. This can make it difficult for some children to learn how to ride a bicycle. Injuries to the children are frequent, and damage to their bicycles often occurs. These difficulties are attributable to the sudden change in the handling characteristics of the bicycle. This is frightening to the child and usually requires the parent to run along side the bike to provide stability assistance. It would therefore be desirable to provide improved bicycle training wheels that could eliminate this difficult transition.

SUMMARY OF THE INVENTION

It is therefore the primary object of the present invention to provide an improved bicycle training wheel assembly.

In accordance with the present invention a bicycle training wheel assembly comprises a brace having an inner mounting member for attachment to a rear fork member of a bicycle frame and at least one side support member connected to and extending from the inner mounting member. The assembly further comprises an elongate arm having an an auxiliary wheel rotatably mounted to an outer end thereof and having an inner end pivotally mounted to the side support member of the brace. This allows the arm to pivot laterally with respect to a longitudinal axis of the bicycle frame to thereby raise and lower the auxiliary wheel through a predetermined range of angular movement. The arm may be selectively locked at one of a plurality of angular adjustment positions. A pair of the training wheel assemblies can be mounted to opposite sides of a bicycle with the arms initially swung all the way down so that both auxiliary wheels contact the ground at all times and the bicycle is held vertically while the child pedals. Thereafter, over a period of time the arms may be progressively raised in equal amounts so that the child is required to rely on his or her own balance to an ever increasing extent.

BRIEF DESCRIPTION OF THE DRAWINGS

FIG. 1 is a rear end elevation view of a bicycle equipped with a pair of identical bicycle training wheel assemblies constructed in accordance with a preferred embodiment of my invention. Raised positions of the assemblies are illustrated in phantom lines.

FIG. 2 is an enlarged fragmentary sectional view of one of the elongate arms incorporated in the training wheel assemblies of FIG. 1.

FIG. 3 is an enlarged fragmentary side elevation view of one of the braces of the assemblies of FIG. 1 mounted over a rear fork member of the bicycle frame shown in phantom lines. The view of FIG. 3 is taken along lines 3—3 of FIG. 1.

FIG. 4 is an enlarged fragmentary top elevation view of one of the training wheel assemblies of FIG. 1 with its upper plastic edge guard removed.

FIG. 5 is an enlarged fragmentary rear end view taken from the left side of FIG. 3.

DESCRIPTION OF THE PREFERRED EMBODIMENT

A bicycle training wheel assembly 10 (FIG. 1) includes a U-shaped brace 12 having a planar inner mounting member 14 (FIGS. 3 and 5) for attachment over a rear fork member 16 of a bicycle frame. The brace 12 further has a pair of planar side support members 18 (FIG. 3) connected to and extending orthogonally from the inner mounting member 14. The side support members 18 have a plurality of pairs of aligned angular adjustment holes 20 (FIG. 1) therethrough which define a plurality of discrete angular adjustment positions. The inner mounting member 14 has a pair of vertically spaced holes 22 and 23 (FIG. 3) formed therein for receiving therethrough an end 24 of a threaded rear axle of a bicycle wheel. This permits the mounting member 14 to be attached to the fork member by tightening a bolt 26 (FIG. 5) over the rear axle.

The upper edges 18a (FIG. 4) of the support members 18 are preferably rounded and covered by a snap-on plastic guard 19 (FIG. 1). This protects the child from injury in the event that he or she should fall on top of the training wheel assembly.

An elongate strut arm 28 (FIG. 1), also having a U-shaped cross-section to provide rigidity, has an inner end and an outer end. The outer end 28a of the arm is bent or angled relative to the remaining portion of the arm. An auxiliary wheel 30 is rotatably mounted to the outer end 28a of the arm via bolt assembly 32 which extends through a slot (not illustrated) in the outer arm end 28a. Means are provided for mounting the inner end of the arm between the side support members 18 of the brace 12 so that the arm can pivot laterally (left and right in FIG. 1) with respect to a longitudinal axis of the bicycle frame (extending orthogonal to the page in FIG. 1). This raises and lowers the auxiliary wheel 30 through a predetermined range of angular movement which encompasses the plurality of angular adjustment positions. The arm mounting means includes a shaft 34 (FIG. 4) which extends through holes 28b (FIG. 2) in the enlarged inner end 28c of the arm 28. The shaft 34 has a pair of opposite ends which extend through holes in corresponding ones of the side support members 18. The shaft 34 may be provided in the form of a bolt assembly including a lock nut 36 for holding the same in position.

Means are provided for selectively locking the arm 28 at one of the plurality angular adjustment positions. A removable pin 38 (FIG. 4) is slideable through either holes 40a or 40b (FIG. 2) in the inner end 28c of the arm and through a selected pair of the aligned angular adjustment holes 20 (FIG. 1) in the side support members 18. The holes 20 are arranged in two arcs 20a and 20b on each of the side support members 18. This allows the holes to be formed so that successive angular adjustment positions are only seven degrees apart, for example. Without providing successive holes 20 in alternate arcs, there might not be enough of the member 18 between the holes to provide sufficient structural strength. A cotter pin 41 (FIG. 4) or other suitable device may be secured to one end of the pin 38 to prevent the same from inadvertently sliding out of the holes. The cotter pin is slid through either holes 40a or 40b set depending upon whether holes 20a in the inner arc or holes 20b in the outer arc are selected.

Means are mountable between the rear fork member 16 and the inner mounting member 14 of the brace for preventing rotation of the arm 28 about the rear wheel axle. A square-shaped bracket 42 (FIG. 3) has a central axle receiving hole 43 and a first pair of parallel flanges 44 (FIGS. 3 and 5) that may be received in an axle slot 46 (FIG. 3) in the fork member 16. The bracket 42 further has a second pair of parallel flanges 46 (FIG. 5) that may be received in a pair of slots 48 formed in the inner mounting member 14 of the brace 12. Another set of slots 50 is formed in the inner mounting member 14 in the event that the assembly is mounted with the wheel axle extending through the hole 22. Preferably the arms 28 and the braces 12 are dimensioned so that the slots 48 are used with a bicycle having sixteen inch wheels and the slots 50 are used with a bicycle having twenty inch wheels.

The brace 12 and arm 28 of the preferred embodiment of my training wheel assembly may be inexpensively manufacture of stamped, punched and formed sheet metal. The bracket 42 may be similarly formed of stamped and formed sheet metal, although of heavier gauge. The shaft, pin and bolt assemblies may be off-the-shelf metal parts. The auxiliary wheel 30 is preferably of the inexpensive type that has an injection molded plastic hub and a synthetic rubber tire.

As illustrated in FIG. 1, a pair of the training wheel assemblies 10 can be mounted to opposite sides of a bicycle with the arms 28 initially swung all the way down as shown in solid lines in FIG. 1. In this configuration, both auxiliary wheels 30 contact the ground at all times and the bicycle is held vertically while the child pedals. Thereafter, depending upon the child's proficiency, the arms 28 may be progressively raised in equal amounts so that the child is required to rely on his or her own balance to an ever increasing extent. As the arms 28 are raised, the auxiliary wheels are moved farther outboard. At the same time, the axles of the auxiliary wheels 30 are inclined to afford greater stability when the bicycle tips over enough to engage the auxiliary wheels with the ground.

While I have described a preferred embodiment of my bicycle training wheel assembly, it should be understood that modifications and adaptations thereof will occur to persons skilled in the art. For example, the selective locking means could be replaced with a spring, damper or combination of the two to provide controlled and/or cushioned resistance to upward swinging of the arm. Therefore, the protection afforded my invention should only be limited in accordance with the scope of the following claims.

I claim:

1. A bicycle training wheel assembly, comprising:
    a U-shaped brace having a planar inner mounting member for attachment over a rear fork member of a bicycle frame, a pair of planar side support members connected to and extending orthogonally from the inner mounting member, the side support members having a plurality of pairs of aligned angular adjustment holes therethrough which define a plurality of discrete angular adjustment positions, and the inner mounting member having an aperture formed therein for receiving therethrough an end of a threaded rear axle of a bicycle wheel so that the mounting member can be attached to the fork member by tightening a bolt over the rear axle;
    a elongate arm having an inner end and an outer end;
    an auxiliary wheel;
    means for rotatably mounting the auxiliary wheel to the outer end of the arm;
    means for mounting the inner end of the arm between the side support members of the brace so that the arm can pivot to raise and lower the auxiliary wheel through a predetermined range of angular movement which encompasses the plurality of discrete angular adjustment positions, the arm amounting means including a shaft which extends through the inner end of the arm and has a pair of opposite ends which are connected between the side support members; and
    means for selectively locking the arm at one of a plurality of discrete angular adjustment positions including a removable pin which is slideable through a hole in the inner end of the arm and through a selected pair of the aligned angular adjustment holes in the side support members.

2. A bicycle training wheel assembly according to claim 1 wherein the pairs of aligned angular adjustment holes are arranged in two arcs on each of the side support members.

3. A bicycle training wheel assembly according to claim 1 and further comprising means mountable between the fork member and the inner mounting member of the brace for preventing rotation of the arm about the rear wheel axle.

4. A bicycle training wheel assembly according to claim 3 wherein the means for preventing rotation includes a bracket having a first pair of flanges that may be received in an axle slot in the fork member and second pair of flanges that may be received in a pair of slots formed in the inner mounting member of the brace.

5. A bicycle training wheel assembly, comprising:
    a U-shaped brace having a planar inner mounting member for attachment over a rear fork member of a bicycle frame, a pair of planar side support members connected to and extending orthogonally from the inner mounting member, the side support members having a plurality of pairs of aligned angular adjustment holes therethrough which are arranged in two arcs on each of the side support members to define a plurality of discrete angular adjustment positions, and the inner mounting member having an aperture formed therein for receiving therethrough an end of a threaded rear axle of a bicycle wheel so that the mounting member can be attached to the fork member by tightening a bolt over the rear axle;
a elongate arm having an inner end and an outer end;
an auxiliary wheel;
means for rotatably mounting the auxiliary wheel to the outer end of the arm;
means for mounting the inner end of the arm between the side support members of the brace so that the arm can pivot to raise and lower the auxiliary wheel through a predetermined range of angular movement which encompasses the plurality of discrete angular adjustment positions, the arm mounting means including a shaft which extends through the inner end of the arm and has a pair of opposite ends which are connected between the side support members; and
means for selectively locking the arm at one of a plurality of discrete angular adjustment positions including a removable pin which is slideable through a hole in the inner end of the arm and through a selected pair of the aligned angular adjustment holes in the side support members.

6. A bicycle training wheel assembly according to claim 5 and further comprising means mountable between the fork member and the inner mounting member of the brace for preventing rotation of the arm about the rear wheel axle.

7. A bicycle training wheel assembly according to claim 6 wherein the means for preventing rotation includes a bracket having a first pair of flanges that may be received in an axle slot in the fork member and second pair of flanges that may be received in a pair of slots formed in the inner mounting member of the brace.

* * * * *